Oct. 6, 1925.
F. LING
1,556,289
CUSHION FOR BILLIARD AND LIKE TABLES
Filed Jan. 28, 1925
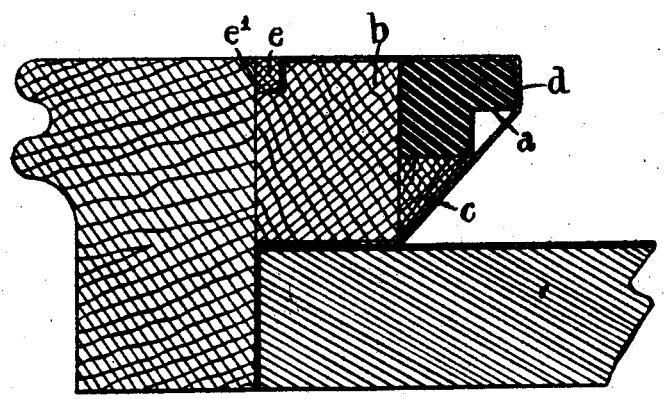
Inventor:
Frederick Ling.
By Harold D. Penney
Atty.

Patented Oct. 6, 1925.

1,556,289

UNITED STATES PATENT OFFICE.

FREDERICK LING, OF LONDON, ENGLAND, ASSIGNOR TO THURSTON AND COMPANY LIMITED, OF LONDON, ENGLAND.

CUSHION FOR BILLIARD AND LIKE TABLES.

Application filed January 28, 1925. Serial No. 5,267.

*To all whom it may concern:*

Be it known that I, FREDERICK LING, a subject of the King of Great Britain, residing in London, England, have invented certain new and useful Improvements in Cushions for Billiard and like Tables, of which the following is a specification.

This invention relates to cushions for billiard and like tables.

As at present constructed cushions are formed of solid india rubber.

According to this invention the cushions are constructed of tough cellular or honeycomb rubber whereby considerable economy is effected in the cost of the cushion with a great increase in their resiliency.

The rubber may be of any desired cross-sectional outline and have the effective surface of the whole or any part of the outer surface covered with sheet of solid rubber or any other material or combination of materials, or said rubber may form an integral portion of said effective or outer surfaces, and may be wholly or partly reinforced with canvas or other material as may be found desirable.

If desired a core may be provided to increase or diminish the resiliency, for example a steel wire or strip may be provided.

In order that the invention may be the better understood reference is made to the accompanying drawings illustrating a form of cushion in accordance with this invention.

In the drawings $a$ indicates the cushion of substantially inverted L-shaped outline which I have found in practice to be very efficient and which cushion is secured by a suitable adhesive to the upper part of the outer face of the wooden strip or rail $b$. If desired a fillet $c$ may be placed below the cushion to assist in supporting same.

The cushion is covered by an outer cover of felt or the like, indicated by $d$, one end or edge of which is secured to the underside of the said rail $b$ whilst the other edge is secured by means of the fillet $e$ engaging the recess $e^1$ formed in the back of the rail $b$.

The construction of the table is that usually employed.

Whilst I do not desire to limit myself to any specific method of production of the cellular rubber, I have found in practice that a very suitable material may be produced by the known method according to which I take a mixture consisting of rubber, sulphur, zinc oxide and/or other mineral filler such as carbon black or litharge, to which I add a gas producing substance, for example ammonium carbonite, to the extent of about 5%. The mixture is then forced into the approximate desired shape through an ordinary extruding machine, after which it is placed in a mould of exactly the desired shape and vulcanized by any of the ordinary known methods of hot vulcanization.

By this means there is produced a rubber having more or less minute cells or pores and possessing the desired resiliency.

I have found that with a rubber such as described the cushion is considerably faster than any of the cushions at present in use and presents the further advantage of being considerably cheaper to construct.

The dimensions of the cells or pores may be varied as desired, the degree of resiliency presented by the rubber varying in accordance therewith.

Claims:

1. A billiard table cushion formed of tough cellular rubber.

2. A billiard table cushion formed of tough cellular rubber and an outer covering for said cushion.

3. A billiard table cushion formed of tough cellular rubber, and an outer covering of rubber.

4. A billiard table cushion formed of tough cellular rubber and a core for said cushion.

5. A billiard table cushion formed of tough cellular rubber, a core for said cushion and an outer cover for said cushion.

6. A billiard table cushion formed of tough cellular rubber, a core for said cushion and an outer cover for said cushion formed of rubber.

7. A billiard table cushion formed of tough cellular rubber comprising a body portion of rectangular cross-sectional outline and an overhanging portion against which the ball strikes.

8. A billiard table cushion formed of tough celullar rubber comprising a body portion of rectangular cross-sectional outline, an overhanging portion against which the ball strikes, and a core for said cushion.

9. A billiard table cushion formed of tough cellular rubber comprising a body portion of rectangular cross-sectional outline, an overhanging portion against which the ball strikes, and an outer cover for said cushion.

10. A billiard table cushion formed of tough cellular rubber comprising a body portion of rectangular cross-sectional outline, an overhanging portion against which the ball strikes, and an outer cover for said cushion formed of india rubber.

11. A billiard table cushion formed of tough cellular rubber comprising a mixture of rubber, sulphur, zinc oxide and a mineral filler, to which is added a gas producing substance.

12. A billiard table cushion formed of tough cellular rubber, comprising a mixture of rubber, sulphur, zinc oxide and a mineral filler, to which is added ammonium carbonate.

In witness whereof I have hereunto set my hand.

FREDERICK LING.